US011554637B2

(12) United States Patent  
Grant et al.

(10) Patent No.: US 11,554,637 B2  
(45) Date of Patent: Jan. 17, 2023

(54) UNIVERSAL PASSENGER SERVICE UNIT

(71) Applicant: Bombardier Inc., Dorval (CA)

(72) Inventors: Robert Grant, Toronto (CA);  
Christopher Carrick, Toronto (CA);  
Leo Branconnier, Crabtree (CA);  
Maryam Safi, Toronto (CA)

(73) Assignee: BOMBARDIER INC.

( * ) Notice: Subject to any disclaimer, the term of this patent is extended or adjusted under 35 U.S.C. 154(b) by 455 days.

(21) Appl. No.: 16/724,175

(22) Filed: Dec. 20, 2019

(65) Prior Publication Data

US 2020/0207183 A1 Jul. 2, 2020

Related U.S. Application Data

(60) Provisional application No. 62/785,222, filed on Dec. 26, 2018.

(51) Int. Cl.
| | |
|---|---|
| *B60H 1/24* | (2006.01) |
| *B60Q 3/44* | (2017.01) |
| *B60Q 3/47* | (2017.01) |
| *B64D 11/00* | (2006.01) |
| *B64D 13/00* | (2006.01) |

(52) U.S. Cl.  
CPC .............. *B60H 1/245* (2013.01); *B60Q 3/44* (2017.02); *B60Q 3/47* (2017.02); *B64D 11/00* (2013.01); *B64D 13/00* (2013.01); *B64D 2011/0046* (2013.01); *B64D 2011/0053* (2013.01); *B64D 2013/003* (2013.01)

(58) Field of Classification Search  
CPC ........ B60H 1/245; B60H 1/3442; B60Q 3/44; B60Q 3/47; B64D 11/00; B64D 13/00; B64D 2011/0046; B64D 2011/0053; B64D 2013/003; B64D 11/0015

See application file for complete search history.

(56) References Cited

U.S. PATENT DOCUMENTS

| | | | |
|---|---|---|---|
| 5,328,152 A | * | 7/1994 | Castle ................. B60H 1/3442 74/25 |
| 7,340,333 B2 | | 3/2008 | Lenneman et al. |
| 2015/0036368 A1 | * | 2/2015 | Rittner ..................... B60Q 3/44 362/471 |

OTHER PUBLICATIONS

Shah, Vivek "Deep Tread", May 29, 2018.

* cited by examiner

*Primary Examiner* — Valentina Xavier  
(74) *Attorney, Agent, or Firm* — Fishman Stewart PLLLC

(57) ABSTRACT

A personal service unit (PSU) includes a housing, a dial, and a flow control ring. The dial is rotatable about the housing. The housing includes a longitudinal axis therethrough and a first end and a second end opposite the first end. The dial includes a helical first portion along an interior wall of the dial. The flow control ring includes a helical second portion along an exterior wall of the flow control ring. The helical second portion rotatably mates with the helical first portion and rotation of the dial in a first direction moves the flow control ring in a first direction along the longitudinal axis to cause a first adjustment in airflow past the flow control ring and rotation of the flow control ring in an opposite direction moves the flow control ring in an opposite direction to cause a second adjustment in airflow past the flow control ring.

20 Claims, 11 Drawing Sheets

UNIVERSAL PASSENGER SERVICE UNIT

CROSS-REFERENCE TO RELATED APPLICATION

This application claims the benefit of U.S. Provisional Application Ser. No. 62/785,222 filed on Dec. 26, 2018. Further, the U.S. Provisional Application Ser. No. 62/785,222 is incorporated herein by reference in its entirety.

FIELD OF TECHNOLOGY

A passenger service unit is disclosed. Improvements are applicable to aircrafts and other vehicles that employ passenger service units.

BACKGROUND

Personal service units (PSUs) are generally employed in passenger vehicles such as aircrafts and trains. These PSUs play an important role in the passenger experience. A PSU generally provides an assortment of functionality to the passenger. For example, a PSU often provides gasper control (i.e., airflow control), reading light control, and a flight attendant call button to the passenger. Further, a PSU often provides information to the passenger via signage. A fasten seatbelt sign, for example, notifies the passenger when it is important to remain seated with the seatbelt fastened, while "no smoking" signage notifies the passenger of the importance of not smoking in an aircraft. An assortment of other functionality may also be provided to the passenger via the PSU.

Often PSU functionality is provided to the passenger via an overhead panel. Further, each functionality is presented as a distinct and discrete component of the PSU spread out over the overhead panel. That is, for example, the panel often includes a no smoking sign, a separate fasten seatbelt sign, a distinct gasper, and separate lighting control. In other words, each functionality of the PSU is often provided to the passenger as a separate discrete component. Installation of these PSUs can be time consuming since it may require the installation of a variety of separate components.

Further, for the sake of symmetry, a PSU for the left side of an aisle in a passenger cabin may be different than a PSU for the right side of the aisle. Still further, aircrafts of different models often have different interiors. As such, a PSU for one model of an aircraft may be different than a PSU for another model of an aircraft. Accordingly, an aircraft manufacturer often manufactures a variety of discrete PSU components and different variations of each component so that they fit properly in different cabin interiors.

As such, PSUs can be costly in light of installation costs and manufacturing costs.

As such, there is a need for improvements in PSUs.

DETAILED DESCRIPTION

Figure 1:
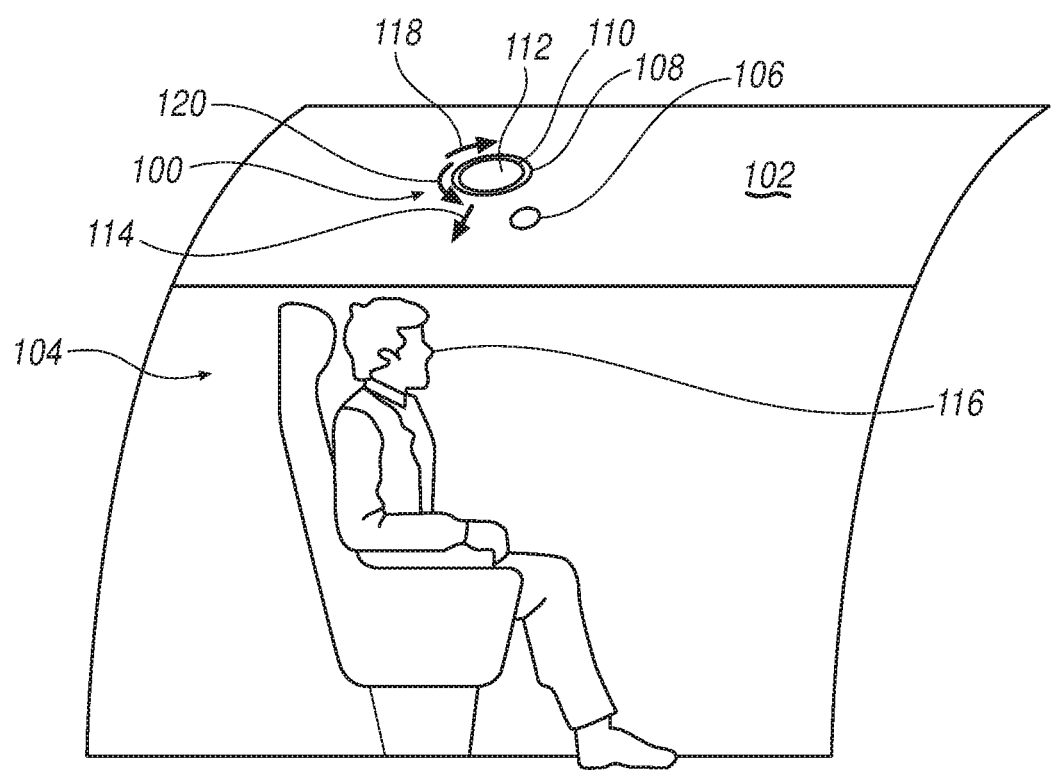
FIG. 1 illustrates a perspective view of an exemplary passenger service unit (PSU) installed in an aircraft cabin.

FIG. 1 illustrates a perspective view of an exemplary universal personal service unit (PSU) 100 mounted to a panel 102 of an aircraft cabin 104. A light 106 (e.g., passenger lighting such as a reading light) may also be coupled to the panel 102. Though not shown, a reading light may instead be integrated into the PSU 100.

The PSU 100 includes a dial 108 encircling a housing 110 and a passenger control unit 112. The dial 108 can be considered a gasper control. That is, the dial 108 can be used to control airflow 114 out of the PSU 100. For example, a passenger 116 can increase airflow 114 out of the PSU 100 by rotating the dial 108 a first direction 118 and decrease the airflow 114 by rotating the dial in a second or opposite direction 120. Alternatively, the airflow 114 may be decreased by turning the dial 108 in the first direction 118 and increased by turning the dial in the second direction 120.

Regardless of what direction dial rotation increases or decreases airflow 114, rotation of the dial 108 in one direction (e.g., the first direction 118) makes a first adjustment to the airflow 114 and rotation of the dial 108 in the opposite direction (e.g., the second direction 120) makes a second (opposite) adjustment to the airflow 114.

The dial 108 may, for example, be comprised of a polymer or metallic material such as aluminum. Further details regarding the gasper control will be set forth below with regard to FIGS. 2A-6.

The control unit 112 of FIG. 1 is controllable by the passenger 116. Further, the control unit 112 may include, for example, functionality such as signage, passenger lighting control, and/or a flight attendant call button or the like. The passenger 116 may interact with the control unit 112 to control functions such as reading light 106 intensity and flight attendant calls. Further, the screen may allow the passenger 116 to receive notifications or information such as fasten seat belt signage, no smoking signage, Wi-Fi status, passenger name, seat number, and/or flight information. Other signage, information, and/or control functions not mentioned may also be included.

The control unit 112 may be comprised of a variety of materials. For example, the control unit 112 may include an organic light-emitting diode (OLED) touchscreen. As such, signage may be presented on the screen when needed and the passenger 116 may interact with the control unit 112 via touching the screen. Alternatively, the control unit 112 may be comprised of a variety of signage and touch or pressure sensitive buttons that allow functionality control. Other materials not mentioned may also be employed in the control unit 112.

The PSU 100 serves as a universal PSU presented in a compact fashion. The PSU 100 is configured to be easily mounted and removed from the passenger cabin 104. Instead of having a separate or discrete unit for each of a gasper, reading light control, no smoking signage, fasten seatbelt signage, flight attendant calls, and etc., the PSU 100 allows for these controls and passenger information to be presented in a compact unit 100. Further, since all of this functionality may be encompassed in the compact unit 100, installation costs are reduced. That is, instead of time being spent installing separate signage and other discrete functionalities into the aircraft cabin (e.g., aircraft cabin 104), one PSU 100 may be installed, thus saving installation costs. Further, due to the compact nature of the PSU 100, the PSU 100 may fit in a variety of different model aircrafts (not shown). As such, different PSUs for different model aircrafts do not need to be manufactured. That is, a single type of PSU (e.g., the PSU 100 of FIG. 1) may be used in different model aircrafts. If variety is desired, the dial 108 may be removed and replaced with another dial (not shown) having a different look and/or made of a different material. Similarly, the control unit 112 may be replaced with a different control unit (not shown) having a different look and/or made of another material.

The PSU 100 may also be serviceable. As such, if any functionality or signage fails to operate properly, the entire PSU 100 may quickly be removed and replaced with a functioning unit. The removed unit may then be serviced to repair any functionality not working properly and then be put back into service.

Figure 2A:
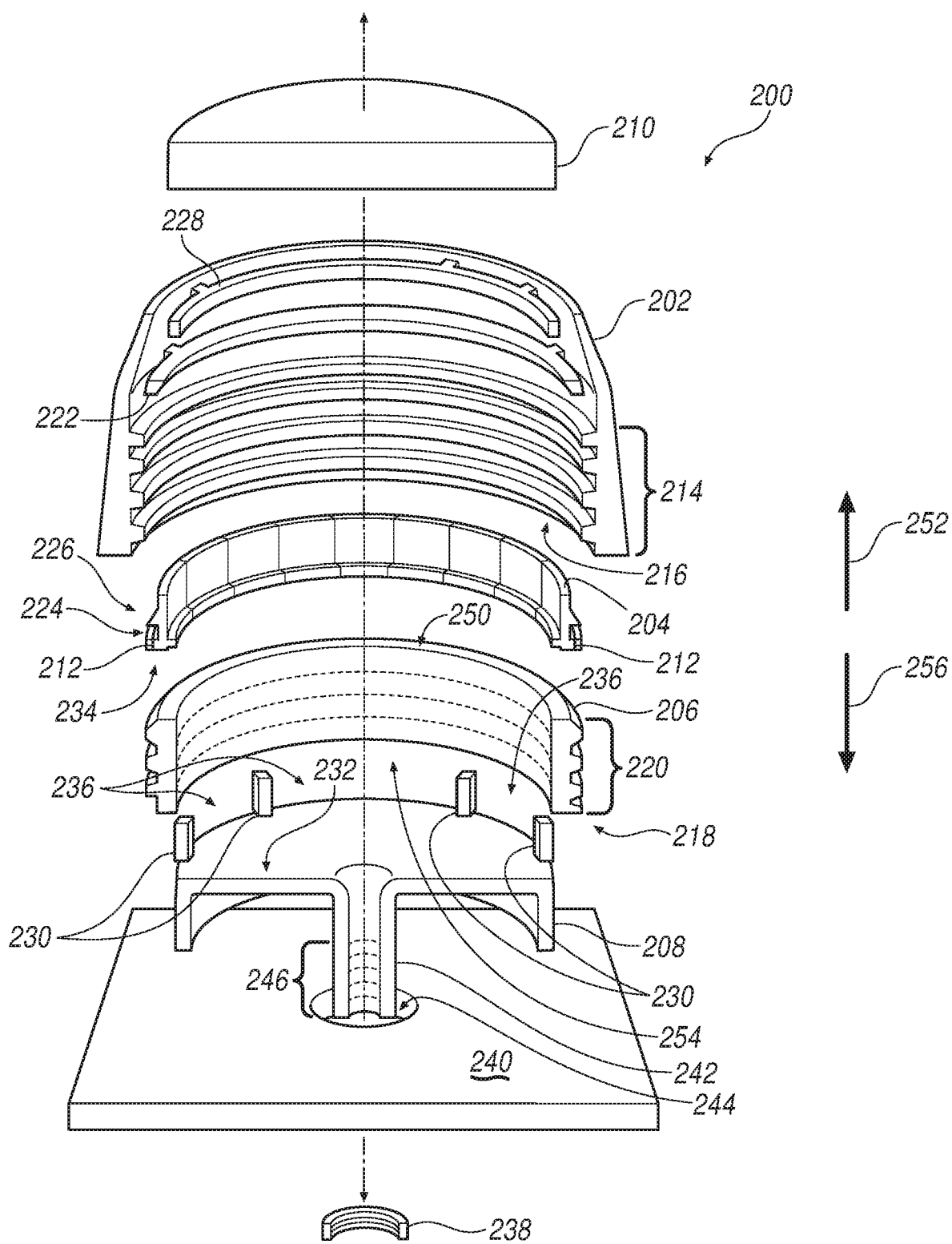
FIG. 2A illustrates an exploded cross-sectional perspective view of another exemplary PSU.

With reference now to FIG. 2A, an exploded cross-sectional view of an exemplary PSU 200 is shown. The PSU 200 includes a dial 202, a housing 204, and a flow control ring 206. The PSU 200 may also include an initial air router 208, a control unit 210, and backlighting 212.

The exemplary dial 202 includes a helical first portion (a.k.a., screw thread) 214 along an interior wall 216. Along an exterior wall 218 of the flow control ring 206 is a helical second portion (a.k.a., screw thread) 220 that threadingly engages with the helical first portion 214. As will be discussed below with respect to FIG. 2B, the helical first portion 214 of the dial 202 rotatably mates with the helical second portion 220 of the flow control ring 206 such that the flow control ring 206 can controlled by the dial 202. Further details regarding the flow control ring 206 will be set forth below with respect to FIGS. 2B-6.

It is noted that the helical first portion 214 may be a helical groove or ridge and the helical second portion 220 may be a helical groove or ridge. The difference between a helical groove and a helical ridge is a matter of perspective. That is, between each ridge of a helical ridge is a helical groove and between each groove of a helical groove is a helical ridge. As such, an area with a helical groove includes a helical ridge and an area with a helical ridge includes a helical groove.

Further, while FIG. 2A illustrates the helical groove/ridge on the helical first and second portions 214, 220 as being uninterrupted, each may have interruptions and still threadingly engage (or rotatably mate) with the other.

With reference back to the dial 202, the dial 202 may also include a coupling rib 222 projecting inwardly from the interior wall 216 of the dial 202. To rotatably couple with the coupling rib 222, the housing 204 may include a coupling slot 224 about its exterior wall 226. As will be described below with respect to FIG. 2B, the coupling slot 224 is configured to hold the coupling rib 222 such that the dial 202 may be rotated without moving longitudinally.

As illustrated in FIG. 2A, the dial 202 may also include a spacing rib 228 that projects from the interior wall 216 of the dial 202. The spacing rib 228 touches, or comes close to touching, the exterior wall 226 of the housing 204. The spacing rib 228 provides stability to the PSU 200 and rotates around the housing 204 as the dial 202 is rotated.

The dial 202 may, for example, be machined from a metallic material such as aluminum or be molded using a polymer. As an alternate example, 3-D printer technology may be implemented to manufacture the dial 202 out of a variety of materials. While FIG. 2A illustrates the dial 202 as a single part, other exemplary approaches may have the dial comprised of a plurality of parts. For example, the spacing rib 228, coupling rib 222, and/or the helical first portion 214 may be separate parts that are coupled (e.g., snap fit) the dial 202.

With regard to the initial air router 208, a plurality of spacers 230 are included on its top surface 232. Alternatively, these spacers 230 could instead be included on a bottom surface 234 of the housing 204. Further, the plurality of spacers 230 may be a discrete part to be coupled to the top surface 232 of the initial air router 208 and/or the bottom surface 234 of the housing 204. Regardless of the spacers employed, the spacers 230 create a gap between the housing 204 and the initial air router 208 when assembled. As such, when assembled, a plurality of airflow passages (openings) 236 are created between the spacers 230. Further details regarding the plurality of airflow passages 236 will be set forth below with respect to FIG. 2B.

As illustrated, the PSU 200 may also include a coupling ring 238 that enables the PSU 200 to be mounted to a panel 240 (see also, e.g., panel 102 of FIG. 1) on the interior of an passenger cabin. As will be shown below with respect to FIG. 2B, a duct 242 of the initial air router 208 may be passed through an opening 244 in the panel 240. The coupling ring 238 may then be screwed on to a threaded portion 246 of the duct 242, thus affixing the PSU 200 to the panel 240 of the passenger cabin (see, e.g., the aircraft cabin 104 of FIG. 1). Though not shown, alternate coupling procedures and/or mechanisms can be employed to couple the PSU 200 to the panel 240. For example, the PSU 200 may be snap-fit to the Panel 240.

If the backlighting 212 is employed, the PSU 200 may be backlit when installed. Further, the control unit 210 may have functionality that allows a passenger to control the intensity of the backlighting 212 and/or the color of the backlighting 212. While FIG. 2A illustrates the backlighting 212 coupled to the housing 204, other exemplary approaches may couple the backlighting 212 to a different part of the PSU 200. The backlighting 212 may, for example, be comprised of one or more discrete light emitting diodes (LEDs) or strip LEDS.

Figure 2B:
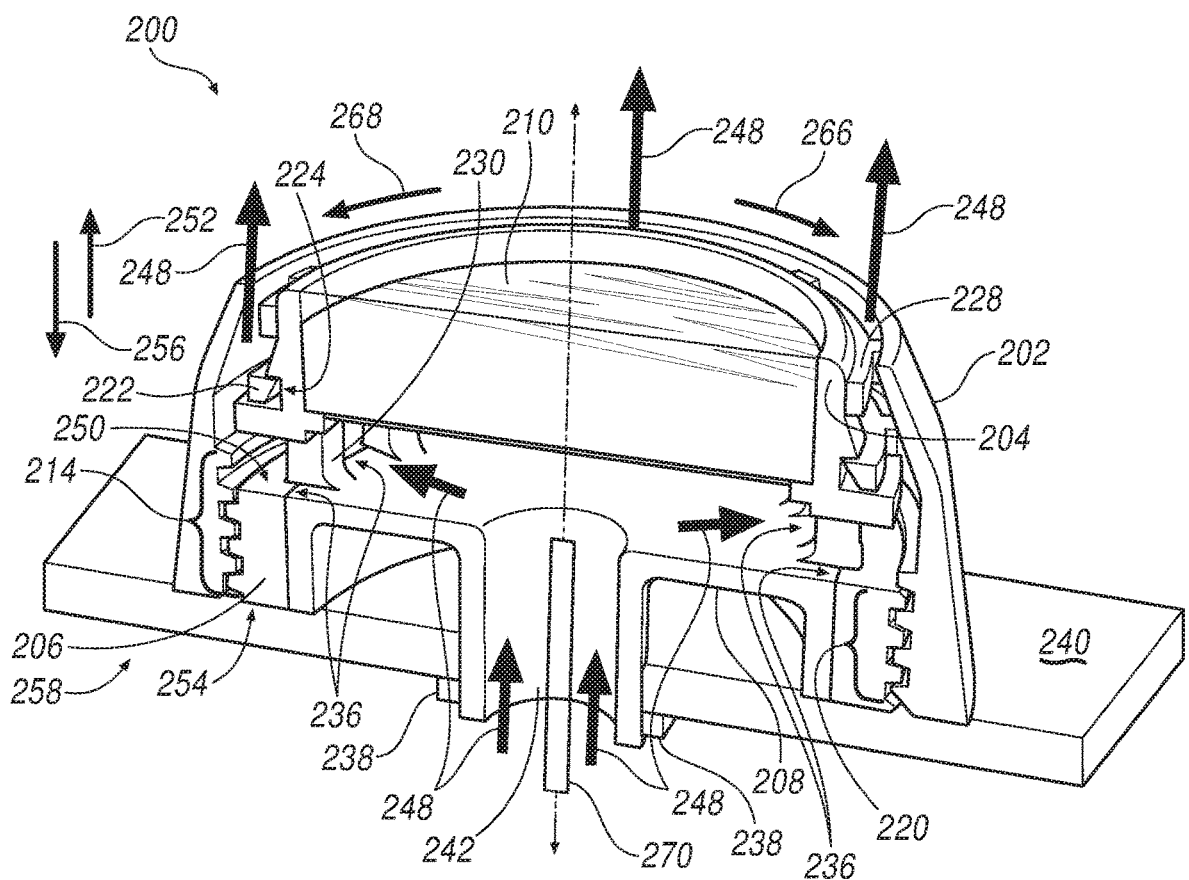
FIG. 2B illustrates the cross-sectional view of the PSU of FIG. 2A assembled.

Referring now to FIG. 2B, the cross-sectional view of the PSU 200 of FIG. 2A is shown assembled. The PSU 200 and its dial 202, housing 204, flow control ring 206, control unit 210, and initial air router 208 are shown.

The exemplary coupling mechanism (i.e., the coupling ring 238) that enables easy installation and removal from the panel 240 is also shown. Alternate coupling mechanisms, however, may instead be employed. For example, though not shown, fasteners may be used or snap-clips may be integrated into the PSU 200 to allow the PSU 200 to be coupled to the panel 240.

The PSU 200 is configured to have airflow 248 pass through a duct 242 of the initial air router 208, through the plurality of airflow passages 236 and through a cavity between the dial 202 and the housing 204 before exiting the PSU 200.

The flow control ring 206 is configured to control the intensity of the airflow 248 through the PSU 200. The flow control ring 206 may, for example, be comprised of a metallic material such as aluminum or a polymer.

The flow control ring 206 includes a first end 250 facing a first longitudinal direction 252 and a second end 254 facing a second (opposite) longitudinal direction 256. FIG. 2B depicts the flow control ring 206 in an open position 258, thus allowing maximum airflow 248 past the first end 250 of the flow control ring 206 and out the PSU 200. However, by blocking or partially blocking the plurality of airflow passages 236 with the flow control ring 206, the intensity of airflow 248 exiting the PSU 200 can be changed. For example, when the flow control ring 206 moves in the first longitudinal direction 252, the airflow 248 passing through the plurality of airflow passages 236 is restricted or decreased as the flow control ring 206 progressively blocks the plurality of airflow passages 236. Accordingly, the airflow 248 past the first end 250 of the flow control ring 206 decreases, thus decreasing airflow 248 out of the PSU 200.

Figure 2C:
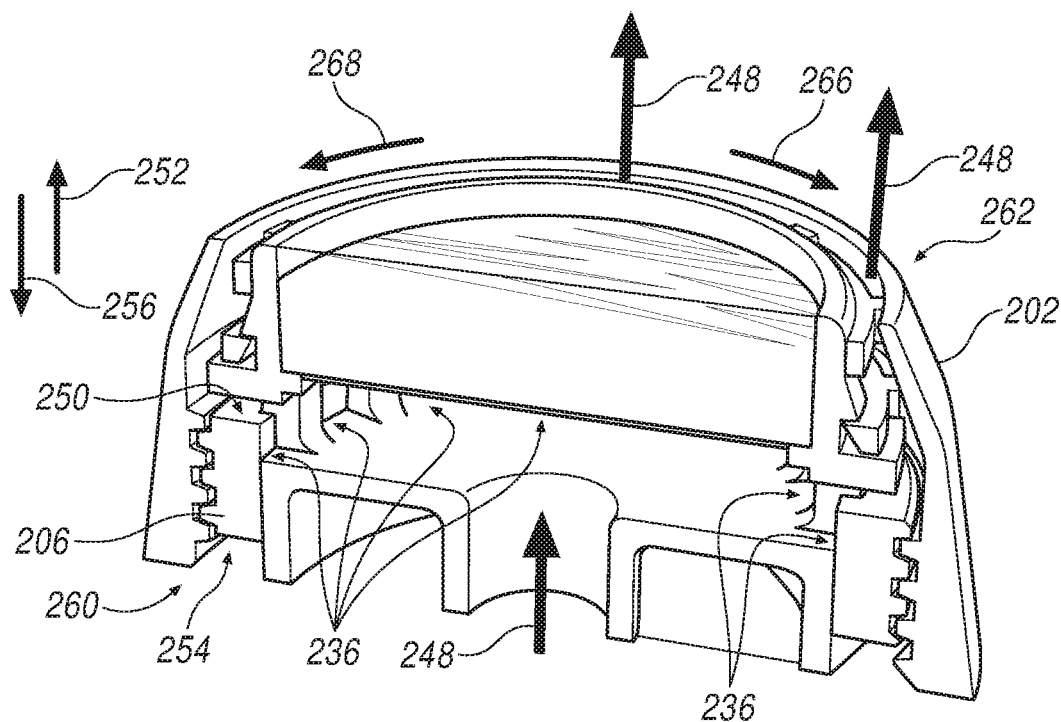
FIG. 2C illustrates the cross-sectional view of the PSU of FIG. 2B in a partially open/closed position.

For example, with reference to FIG. 2C, the flow control ring 206 is shown in a partially closed/open position 260. That is, the flow control ring 206 has moved in the first longitudinal direction 252 towards a passenger facing end 262 of the dial 202. As such, the plurality of airflow passages 236 are restricted or partially blocked by the flow control ring 206 and the airflow 248 exiting the PSU 200 is decreased.

Figure 2D:
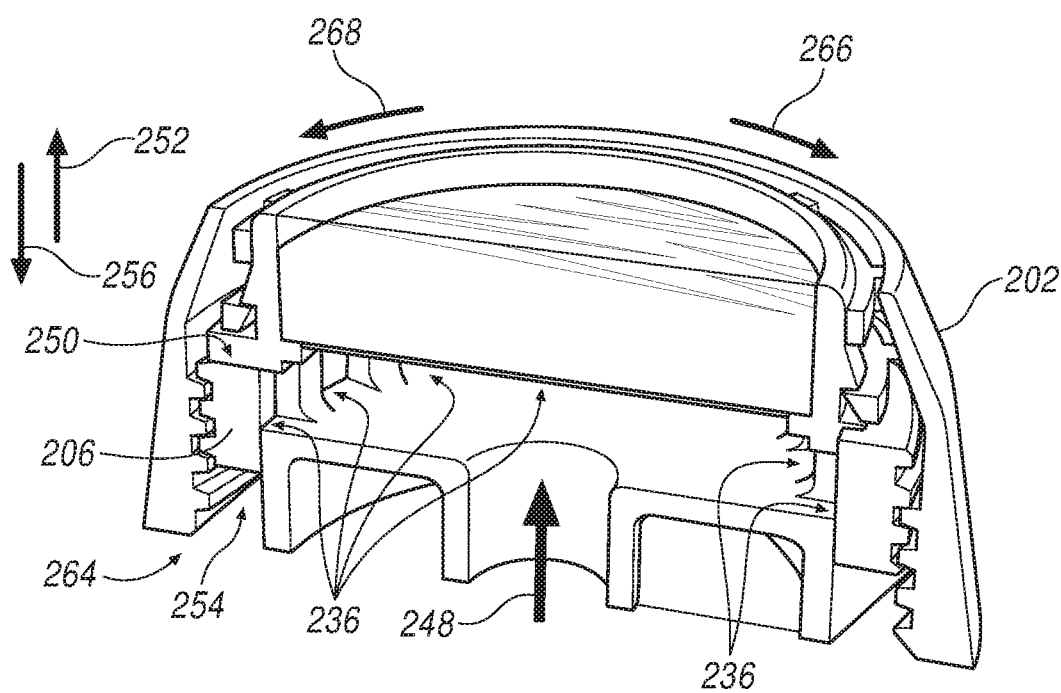
FIG. 2D illustrates the cross-sectional view of the PSU of FIG. 2B in a closed position.

FIG. 2D illustrates the flow control ring 206 moved further in the first longitudinal direction 252 to a blocked position 264. That is, the flow control ring 206 is moved to block or substantially block the plurality of airflow passages 236. Accordingly, the airflow 248 exiting the PSU 200 is stopped or at least substantially decreased.

In a similar manner, if the flow control ring 206 begins in the blocked position 264 (FIG. 2D) and is moved in the second longitudinal direction 256, the previously blocked plurality of airflow passages 236 are then partially opened (see, e.g., FIG. 2C). By continued movement in the second longitudinal direction 256, the flow control ring 206 progressively allows the plurality of airflow passages 236 to be completely opened 258 as shown in FIG. 2B.

With continued reference to FIG. 2B, the airflow 248 is controllable via interaction with the dial 202. As previously mentioned, the coupling rib 222 of the dial 202 couples with the coupling slot 224 of the housing 204. While the coupling slot 224 captures the coupling rib 222, the dial 202 is still allowed to rotate about the housing 204. Accordingly, since the helical first portion 214 of the dial 202 rotatably mates or couples with the helical second portion 220, rotation of the dial 202 can cause the flow control ring 206 to move in either longitudinal direction 252, 256 without allowing the dial 202 to move longitudinally 252, 256. For example, when the dial 202 is rotated in a first direction 266, the mating of the helical second portion 220 and the helical first portion 214 causes the flow control ring 206 to move in the first longitudinal direction 252 to progressively close the plurality of airflow passages 236, thus progressively decreasing the airflow 248 exiting the PSU 200 (see, e.g., FIGS. 2C and 2D). In other words, as the helical first portion 214 of the dial 202 is rotated in the first direction 266, the dial 202 screws into the helical second portion 220 of the flow control ring 206, causing the flow control ring 206 to move in the first longitudinal direction 252.

Alternatively, if the PSU 200 is already in a closed or partially open/closed position (FIGS. 2D and 2C), the dial 202 may be rotated in a second direction 268. As such, the mating between the threads 214, 220 causes the flow control ring 206 to move away from the passenger facing end 262 of the dial 202 in the second longitudinal direction 256, thus progressively opening the plurality of airflow passages 236 to increase the airflow 248 exiting the PSU 200. That is, when the dial 202 is rotated in the second direction 268, the dial 202 effectively begins unscrewing from the flow control ring 206, pushing the flow control ring 206 in the second longitudinal direction 256. As noted above, the interaction between the coupling rib 222 and the coupling slot 224 stops the dial 202 from moving longitudinally 252, 256 as the dial 202 is rotated in either direction 266, 268.

The control unit 210 and backlighting 212 (if employed) may be powered by wiring feed 270 passed up through the duct 242 of the initial air router 208. Since a single wiring feed 270 may be employed, installation and removal of the PSU 200 can be efficiently carried out. For example, a PSU (not shown) not working properly may quickly be replaced between flights. It is noted that other methods of wiring not shown may also be employed to power the control unit 210 and backlighting 212.

As illustrated in FIGS. 2B-2D and discussed above, rotation of the dial 202 in the first direction 266 causes the flow control ring 206 to move in the first longitudinal direction 252 and rotation of the dial 202 in the second direction 268 causes the flow control ring 206 to move in the second longitudinal direction 256. Other examples, however, may do the opposite. For example, though not shown, rotation in the first direction 266 may cause a flow control ring to move in the second longitudinal direction 256 and rotation in the second direction 268 may cause a flow control ring 206 to move in the first longitudinal direction 252. This change can be accomplished by changing the bias of the threads (i.e., the helical first portion 214 and helical second portion 220) on the dial 202 and the flow control ring 206.

Figure 3A:
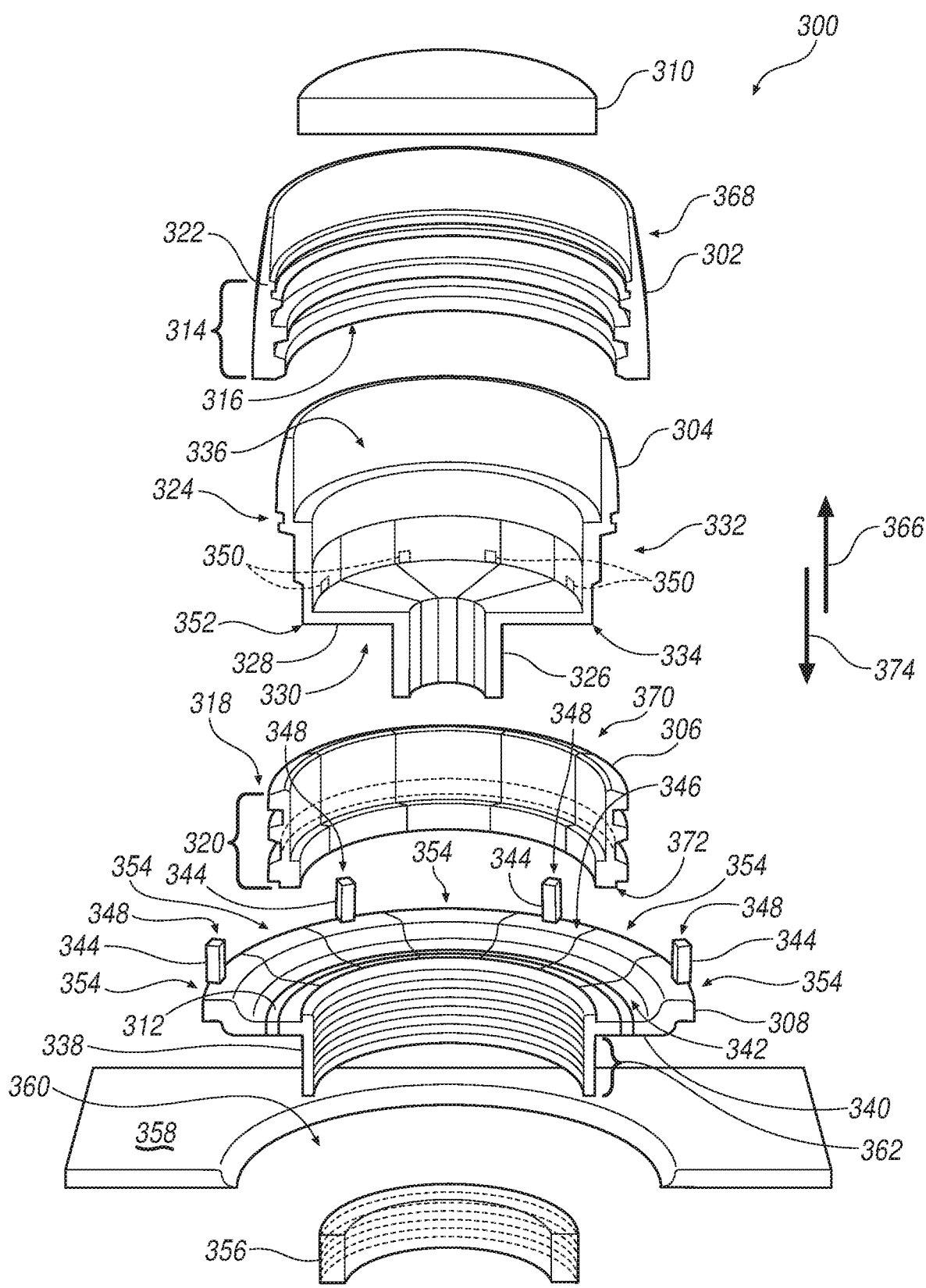
FIG. 3A illustrates an exploded cross-sectional perspective view of another exemplary PSU.

Referring now to FIG. 3A, an exploded cross-sectional view of another exemplary PSU 300 is shown. The PSU 300 includes a dial 302, a housing 304, and a flow control ring 306. The PSU 300 may also include, for example, a bezel 308, a control unit 310, and backlighting 312.

The dial 302 includes a helical first portion (a.k.a., screw thread) 314 along an interior wall 316 of the dial 302. Along an exterior wall 318 of the flow control ring 306 is a helical second portion (a.k.a., screw thread) 320. As will be discussed below with respect to FIG. 3B, the helical first portion 314 of the dial 302 rotatably mates with the helical second portion 320 of the flow control ring 306 such that the flow control ring 306 can controlled by the dial 302. In other words, the threads 314, 320 of the dial 302 and the flow control ring 306 mate or couple such that rotation of the dial 302 controls movement of the flow control ring 306. Further details regarding the flow control ring 306 will be set forth below with respect to FIGS. 3B-3D.

It is noted that the helical first portion 314 may be a helical groove or ridge and the helical second portion 320 may be a helical groove or ridge. As discussed above, the difference between a helical groove and a helical ridge is a matter of perspective. That is, between each ridge of a helical ridge there is a helical groove and between each groove of a helical groove is a helical ridge. As such, an area with a helical groove includes a helical ridge and an area with a helical ridge includes a helical groove.

Further, while FIG. 3A illustrates the helical groove/ridge on the helical first and second portions 314, 320 as being uninterrupted, each may have interruptions and still threadingly engage (or rotatably mate) with the other.

With continued reference to the dial 302, the dial 302 may also include a coupling rib 322 projecting inwardly from the interior wall 316 of the dial 302. The housing 304 may include a coupling slot 324 about its exterior wall 318 to rotatably couple with the coupling rib 322. As will be described below with respect to FIG. 3B, the coupling slot 324 is configured to hold the coupling rib 322 such that the dial 302 may be rotated without moving longitudinally.

The dial 302 may, for example, be machined from a metallic material such as aluminum and/or be molded using a polymer. As an alternate example, 3-D printer technology may be implemented to manufacture the dial 302 out of a variety of materials.

Regarding the housing 304, the housing 304 includes a duct 326 and a flange 328 radially extending outward from one end 330 of the duct 326. Further, there is a wall 332 extending transversely from an outer circumference 334 of the flange 328. As will be illustrated in FIG. 3B, the control unit 310 may be coupled to an interior portion 336 within the housing 304. Alternatively, though not shown, the control unit 310 could be coupled atop the housing 304.

With regard to the bezel 308, the bezel 308 includes a hollow cylindrical wall 338 having a flange 340 radially projecting from one end of the cylindrical wall. A bezel air channel 342 (i.e., an air diverting channel) encircles the flange 340. As will be described below with respect to FIG. 3B, the bezel air channel 342 helps direct airflow exiting the PSU 300 to a passenger (e.g., passenger 116 of FIG. 1).

The bezel 308 also includes a plurality of spacers 344 projecting from its top surface 346. The spacers 344 may be coupleable to the housing 304. For example, a top portion 348 of the spacers 344 may be snap-fit into a plurality of voids 350 in the housing 304 to affix the bezel 308 to the housing 304.

Though not shown, according to another example, instead of having the spacers 300 incorporated into the bezel 308, the spacers 344 may instead be included on a bottom surface 352 of the housing 304. In which case, the spacers may be snap-fit to the bezel. Still further, another example may include the spacers as a separate element that may be snap-fit into both the bezel 308 and the housing 304.

Regardless of the manner in which the spacers 344 are employed, a plurality of airflow passages (openings) 354 are formed between the spacers 344 when the PSU 300 is assembled. Further details regarding the plurality of airflow passages 354 will be set forth below with respect to FIGS. 3B-3D.

As illustrated in FIG. 3A, the PSU 300 may also include a coupling ring 356 that enables the PSU 300 to be mounted to a panel 358 (see also, e.g., panel 102 of FIG. 1) on the interior of a passenger cabin. As will be shown below with respect to FIG. 3B, the cylindrical wall 338 of the bezel 308 may be passed through an opening 360 in the panel 358. The coupling ring 356 may then be screwed on to a threaded portion 362 of the cylindrical wall 338 of the bezel 308 to affix the PSU 300 to the panel 358. Though not shown, alternate coupling procedures and/or mechanisms may be employed to couple the PSU 200 to the panel 340. For example, snap-fit connections may be integrated into the PSU 300 to enable the PSU 300 to be mounted to the panel 358

Figure 3B:
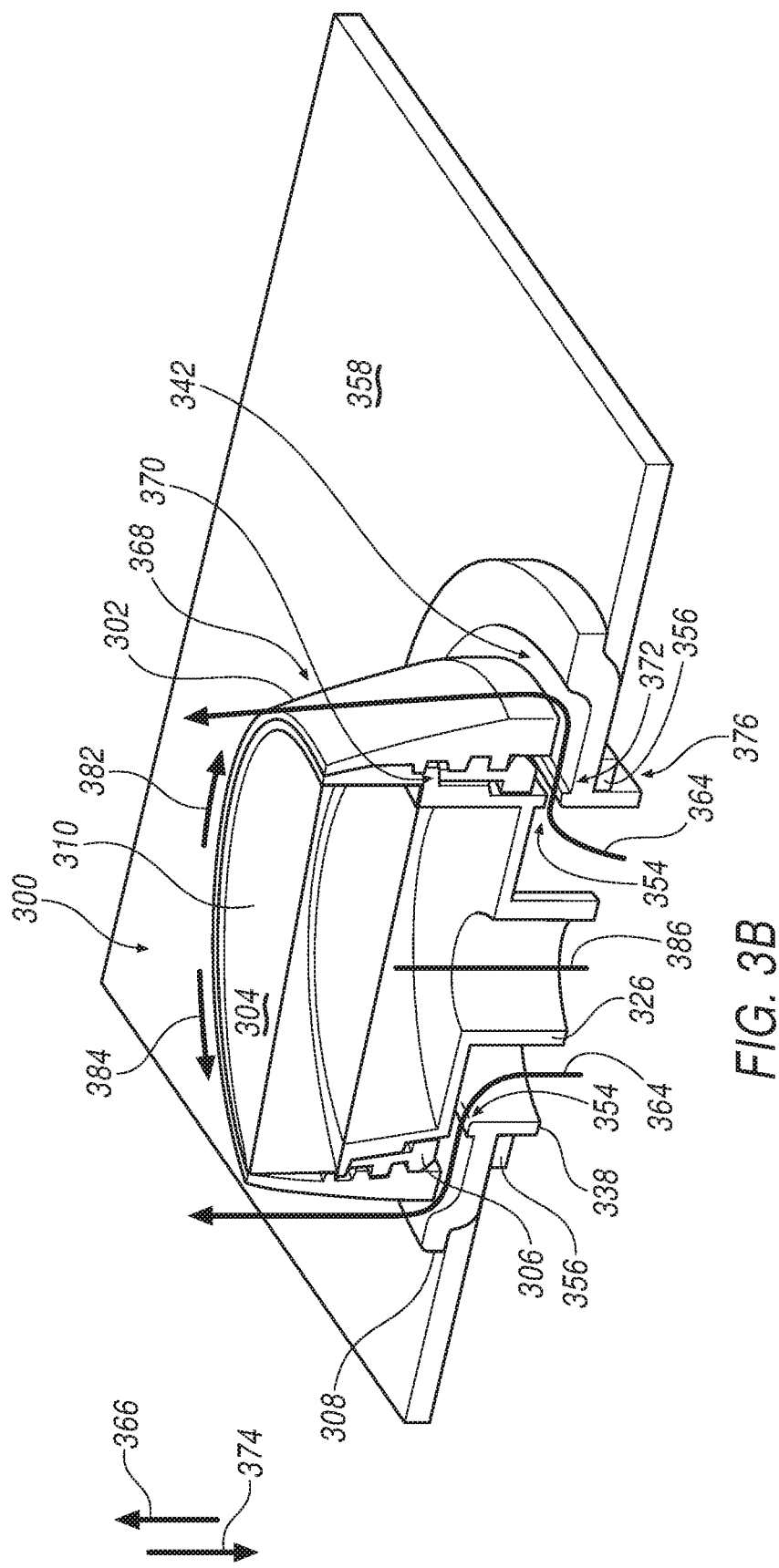
FIG. 3B illustrates the cross-sectional view of the PSU of FIG. 3A assembled.

Referring now to FIG. 3B, the cross-section view of the PSU 300 of FIG. 3A is shown assembled. The PSU 300 and its dial 302, housing 304, flow control ring 306, control unit 310, and bezel 308 are shown.

The PSU 300 is configured to allow airflow 364 to pass between the cylindrical wall 338 of the bezel 308 and the duct 326 of the housing 304, out the plurality of airflow passages 354 (see also FIG. 3A), and under the dial 302 before exiting the PSU 300. As shown in FIG. 3B, the bezel channel 342 diverts or redirects the airflow 364 in a first longitudinal direction 366 towards a passenger (see, e.g., passenger 116 of FIG. 1) such that the airflow 364 along an exterior wall 368 of the dial 302.

The flow control ring 306 is configured to control the intensity of the airflow 364 out of the PSU 300. Further, the flow control ring 306 has a first end 370 (see FIG. 3A) facing the first longitudinal direction 366 and a second end 372 facing a second (opposite) longitudinal direction 374.

FIG. 3B depicts the flow control ring 306 in an open position 376, thus allowing maximum airflow 364 past the second end 372 of the flow control ring 306 and out the PSU 300. However, by blocking or partially blocking the plurality of airflow passages 354 with the flow control ring 306, the intensity of airflow 364 exiting the PSU 300 can be changed. That is, when the flow control ring 306 moves in a second longitudinal direction 374, the airflow 364 passing through the plurality of airflow passages 354 is restricted or decreased as the flow control ring 306 progressively blocks the plurality of airflow passages 354.

Figure 3C:
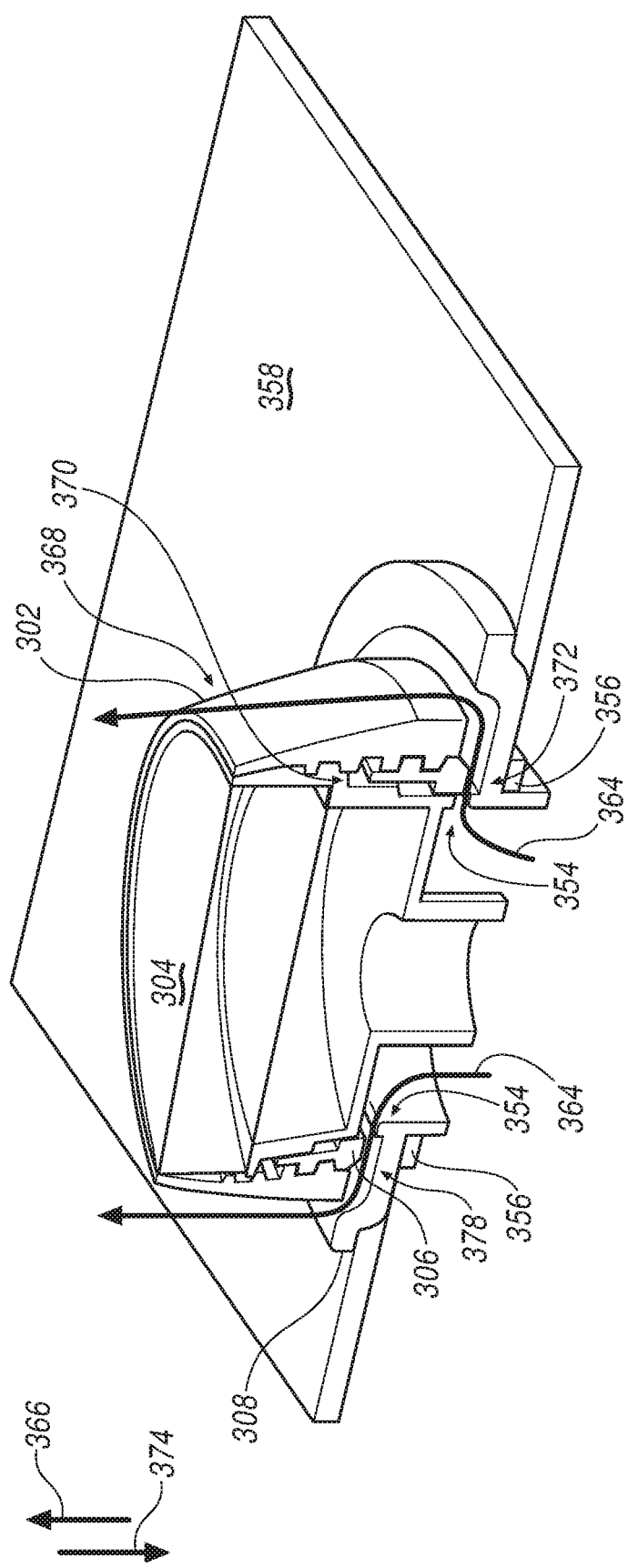
FIG. 3C illustrates the cross-sectional view of the PSU of FIG. 3B in a partially open/closed position.

For example, with reference to FIG. 3C, the flow control ring 306 has moved to a partially closed/open position 378. That is, the flow control ring 306 has moved in the second longitudinal direction 374 towards the bezel 308, thus partially blocking or restricting airflow 364 through the plurality of airflow passages 354. As such, the airflow 364 passing the second end 372 of the flow control ring 306 is decreased, thus decreasing the airflow 364 exiting the PSU 300.

Figure 3D:
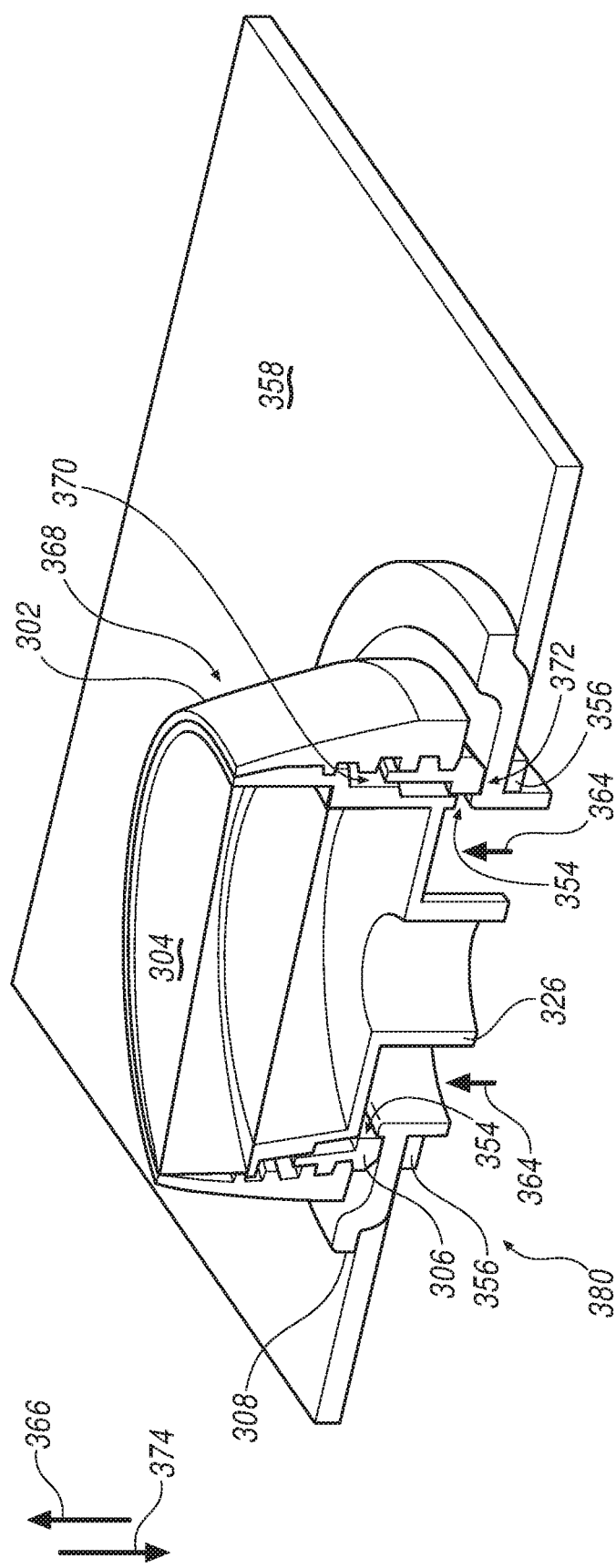
FIG. 3D illustrates the cross-sectional view of the PSU of FIG. 3B in a closed position.

FIG. 3D illustrates the flow control ring 306 moved further in the second longitudinal direction 374 to a blocked position 380. That is, the flow control ring 306 is moved to block or substantially block the plurality of airflow passages 354. Accordingly, airflow 364 exiting the PSU 300 is stopped or at least substantially decreased.

Alternatively, if the flow control ring 306 begins in the blocked position 380 (FIG. 3D) and is moved in the first longitudinal direction 366, the previously blocked plurality of airflow passages 354 are then partially opened (see partially closed/open position 378 FIG. 3C). By continued movement in the first longitudinal direction 366, the flow control ring 306 progressively allows the plurality of airflow passages 354 to be completely opened as shown in FIG. 3B.

With continued reference to FIG. 3B, the flow control ring 306 is moved in either the first or second longitudinal direction 366, 374 via interaction with the dial 302. As previously mentioned, the coupling rib 322 of the dial 302 couples with the coupling slot 324 of the housing 304. While the coupling slot 324 captures the coupling rib 322, the dial 302 is still allowed to rotate about the housing 304. Accordingly, since the helical first portion 314 of the dial 302 rotatably mates or couples with the helical second portion 320, rotation of the dial 302 can cause the flow control ring 306 to move without allowing the dial 302 to move longitudinally 366, 374. For example, when the dial 302 is rotated in a first direction 382, the mating of the helical second portion 320 and the helical first portion 314 causes the flow control ring 306 to move in the second longitudinal direction 374 to progressively close the plurality of airflow passages 354, thus progressively decreasing the airflow 364 exiting the PSU 300 (see, e.g., FIGS. 3C and 3D). In other words, as the helical first portion 314 of the dial 302 is rotated in the first direction 382, the dial 302 effectively unscrews from the helical second portion 320 of the flow control ring 306, thus pushing the flow control ring 306 in the second longitudinal direction 374.

Alternatively, if the PSU 300 is already in a closed or partially open/closed position (FIGS. 3D and 3C), the dial 302 may be rotated in a second direction 384. As such, the mating between the threads 314, 320 causes the flow control ring 306 to move in the first longitudinal direction 366 and progressively open the plurality of airflow passages 354 to increase the airflow 364 exiting the PSU 300. That is, when the dial 302 is rotated in the second direction 384, the dial 302 screws into the flow control ring 306, causing the flow control ring 306 to move in the first longitudinal direction 366.

As noted above, the interaction between the coupling rib 322 and the coupling slot 324 stops the dial 302 from moving longitudinally 366, 374 as the dial is rotated in either direction 382, 384 to move the flow control ring 306.

To power the control unit 310 and backlighting 312 (if employed), a wiring feed 386 may be passed up through the duct 326 of the housing 304. Since a single feed of wiring 386 may be employed, installation and removal of the PSU 300 can be efficiently carried out. For example, a PSU (not shown) that is not functioning properly may quickly be replaced between flights. Though not shown, other manners of powering the control unit 310 and the backlighting 312 may instead be employed.

As illustrated in FIGS. 3B-3D and discussed above, rotation of the dial 302 in the first direction 382 causes the flow control ring 306 to move in the second longitudinal direction 374 and rotation of the dial 302 in the second direction 384 causes the flow control ring 306 to move in the first longitudinal direction 366. Other examples, however, may do the opposite. For example, though not shown, rotation in the first direction 382 may cause a flow control ring to move in the first longitudinal direction 366 and rotation in the second direction 384 may cause a flow control ring to move in the second longitudinal direction 374. This change can be accomplished by changing the bias of the threads (i.e., the helical first portion 314 and helical second portion 320) on the dial 302 and the flow control ring 306.

Figure 4A:
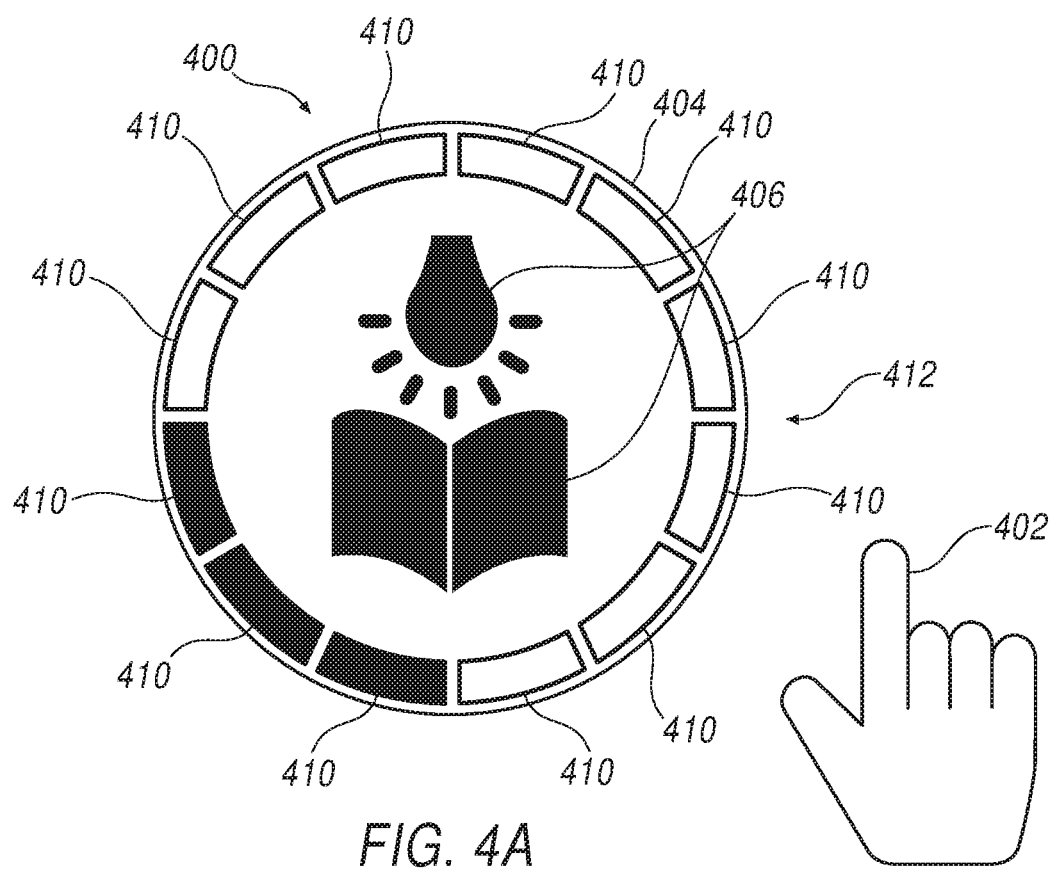
FIG. 4A illustrates an exemplary control unit that may be employed in a PSU.
Figure 4B:
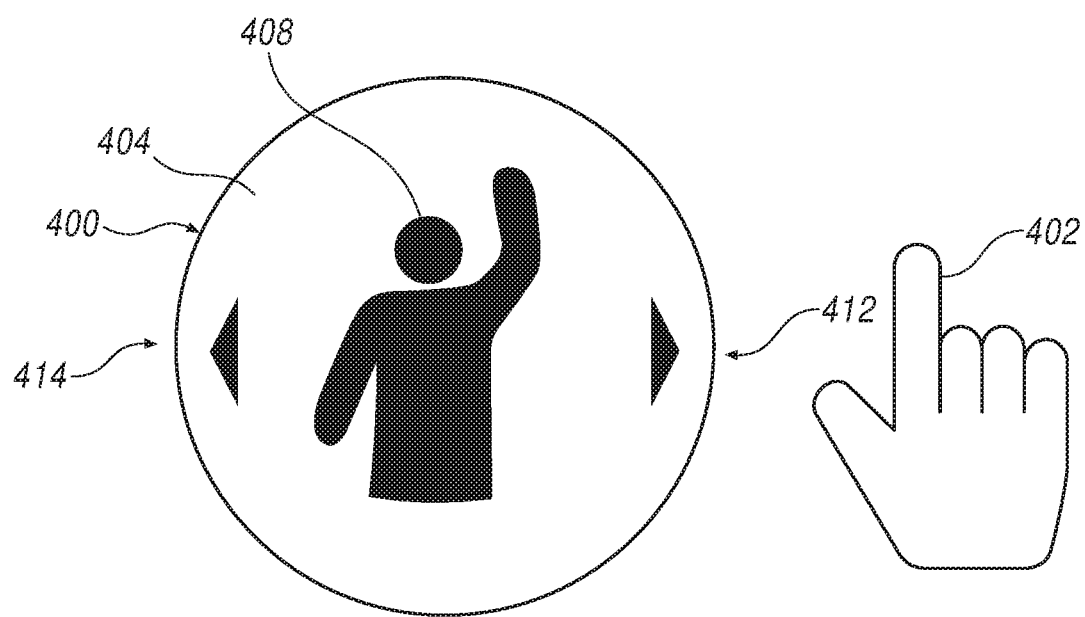
FIG. 4B illustrates the control unit of FIG. 4A with a different icon on its face.

With reference now to FIGS. 4A-4B, an organic light-emitting diode (OLED) control unit 400 is shown. The OLED control unit 400 may serve as the control unit (see, e.g., the control units 112, 210, 310 of FIGS. 1-3B) for exemplary PSUs.

The OLED control unit 400 is configured to provide a passenger 402 the ability to cycle through different functionalities (e.g., lighting control, flight attendant calls, and/or flight information). For example, a dial (e.g., the dials 108, 202, 302 of FIGS. 1-3B) may be rotated to cycle through functionalities. As an alternate example, a touchscreen 404 of the OLED control unit 400 may be used to control and cycle through functionality.

FIG. 4A illustrates a lighting icon 406 on the touchscreen 404 of the OLED control unit 400 and FIG. 4B illustrates a call "button" icon 408 on the touchscreen 404 of the OLED control unit 400. The passenger 402 may touch on the touchscreen 404 to cycle through functions such as the lighting control represented by the lighting icon 406 and the call "button" icon 408. Further, the passenger 402 may touch the icons 406, 408 to control functionality.

For example, the passenger 402 may touch one of a plurality of light intensity icons 410 to set the intensity of a reading light (e.g., the light 106 of FIG. 1 or the backlighting 212, 312 of FIGS. 2A and 3A). Icons different than those shown 406, 410 could instead be used to control lighting. Further, though not shown, instead of controlling lighting intensity, the controls may control lighting color or simply provide on/off functionality of the light(s).

To cycle to a different function, the passenger 402 may, for example, touch a side of the touchscreen 404 (e.g., the right side 412 of the touchscreen 404) to cycle to a different functionality such as the flight attendant call "button" icon 408 represented in FIG. 4B. To place a call or notification to a flight attendant (not shown), the passenger 402 may touch the call "button" icon 408. To cycle back to a different functionality (e.g., the lighting icon 406), the passenger 402 may, for example, touch a different side of the touchscreen 404 (e.g., the left side 414 touchscreen 404).

It is noted that other tapping or touching procedures may be used for controlling the OLED control unit 400. Further, gesture control may also be employed such that the passenger 402 does not have to make contact with the touchscreen 404.

While not shown, the touchscreen 404 may present other information and functionality that the passenger 402 may interact with. For example, passenger flight information, no smoking signage, and fasten seatbelt signage may be presented on the OLED control unit 400 to the passenger 402.

Figure 5:
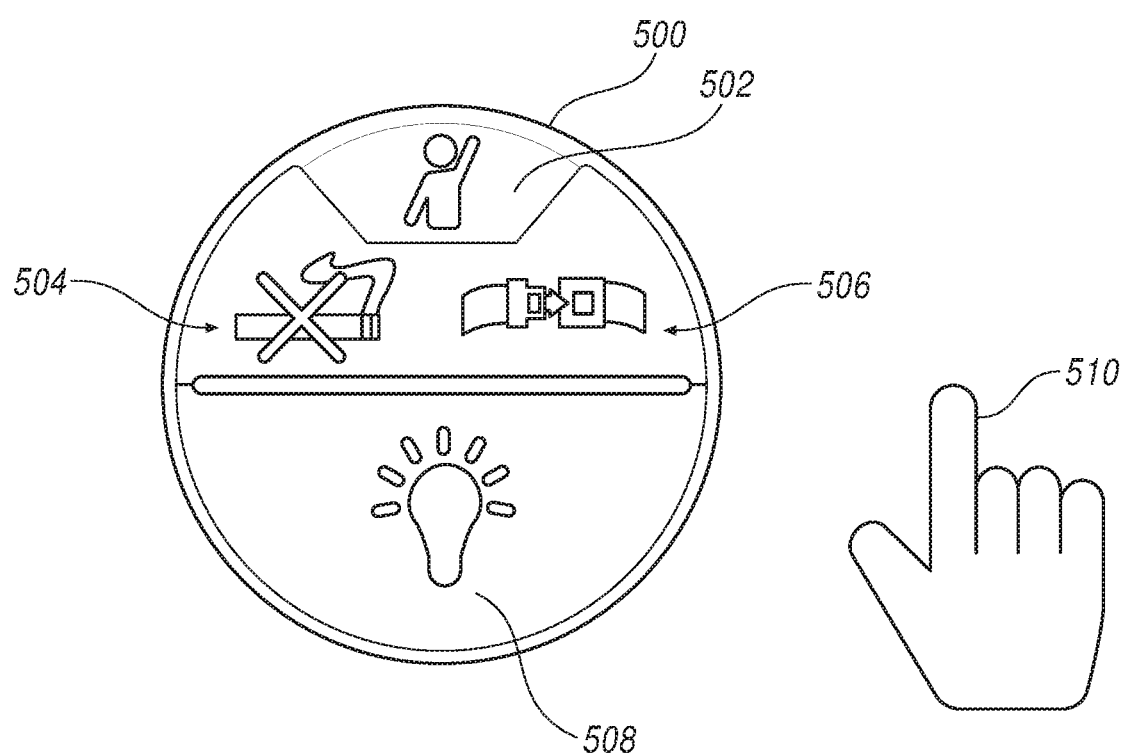
FIG. 5 illustrates another exemplary control unit that may be employed in a PSU.

Referring now to FIG. 5, another exemplary control unit 500 is illustrated. The control unit 500 may include, for example, a flight attendant call button (or touch item) 502, no smoking signage 504, fasten seatbelt signage 506, and a lighting control button (or touch item) 508.

The signage 504, 506 may be controlled by aircraft personnel, while the call button 502 and the lighting control button 508 may be controlled by a passenger 510. For example, the passenger 510 may simply push or touch the call button 502 to notify an attendant that assistance is needed. Similarly, the passenger 510 may touch or push the lighting control button 508 to turn on or off a light (see, e.g., the light 106 of FIG. 1 or the backlighting 212, 312 of FIGS. 2A and 2B). Further, the control unit 500 may be configured to allow for long touches or presses of the lighting control button 508 to vary lighting intensity.

While two types of control units 400, 500 are illustrated in FIGS. 4A-5, PSUs discussed herein may employ other types of control units not shown.

Figure 6:
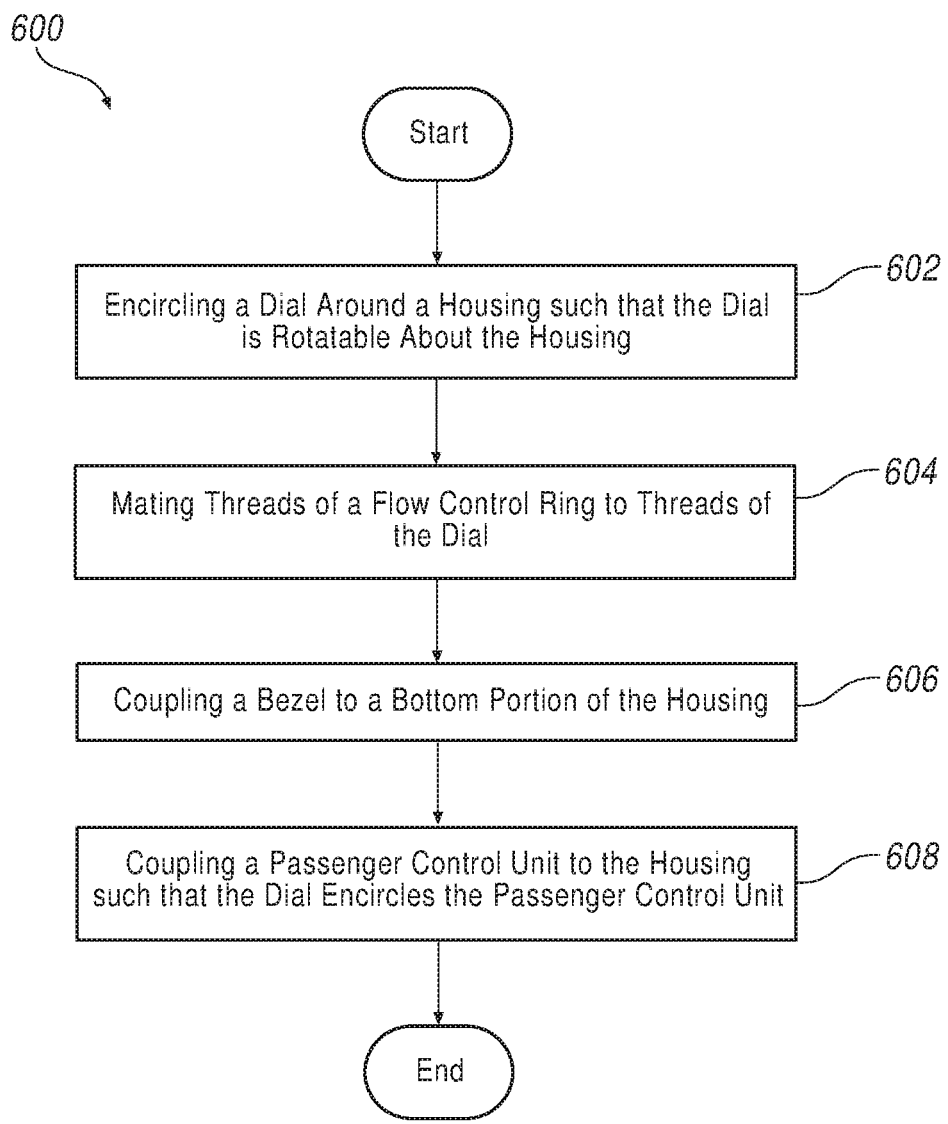
FIG. 6 sets forth a technique for assembling a PSU.

With reference now to FIG. 6, an exemplary technique 600 for assembling a personal service unit (PSU) is set forth in a flowchart. The assembled PSU is mountable to a passenger cabin interior.

An exemplary process control may begin at BLOCK 602 where encircling a dial around a housing such that the dial is rotatable about the housing is carried out. The dial includes a passenger facing end and an opposite end. Process control may then proceed to BLOCK 604 where mating of threads of a flow control ring to threads of the dial is carried out. The threads are mated such that rotation of the dial in a first direction moves the flow control ring towards the passenger facing end of the dial and rotation of the dial in an opposite direction moves the flow control ring towards the opposite end of the dial.

The rotation of the dial in the first direction either increases airflow past the flow control ring and out of the PSU or decreases airflow past the flow control ring and out of the PSU. Rotation in the opposite direction, on the other hand, has an opposite effect on airflow than rotation in the first direction. For example, if rotation in the first direction increases airflow past the flow control ring, then rotation in the opposite direction decreases airflow past the flow control ring. Alternatively, if rotation in the first direction decreases airflow past the flow control ring, then rotation in the opposite direction increase airflow past the flow control ring.

According to an example, the rotation of the dial in the first direction moves the flow control ring towards the passenger facing end of the dial to decrease airflow. Further, in this example the airflow moving past the flow control ring may pass between the dial and the housing as it exits the PSU.

According to another example, technique 600 may include coupling a bezel to a bottom portion of the housing at BLOCK 606. The bezel may include a bezel channel around the bezel that is configured to direct the airflow past the flow control ring along an outside wall of the dial and to a passenger. In such an example, the rotation of the dial in the first direction moves the flow control ring towards the opposite end of the dial.

After mating threads of a flow control ring to threads of the dial at BLOCK 604 (or the coupling of the bezel at BLOCK 606 if employed), process control may proceed to BLOCK 608, where coupling a passenger control unit to the housing such that the dial encircles the passenger control unit is carried out. The passenger control unit allows a passenger to control lighting and an attendant calls.

After coupling the passenger control unit to the housing, process control proceeds to an END.

While an order to BLOCKS 602-608 are set forth above with respect to the exemplary technique 600, other techniques not shown may carry out BLOCKS 602-608 in a different order. For example, the mating of the threads of the flow control ring with the threads of the dial (BLOCK 604) may be carried out prior to, or during, the encircling of the dial around the housing such that the dial is rotatable about the housing (BLOCK 602).

With regard to FIGS. 1-6 and the processes, systems, methods, techniques, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A personal service unit (PSU) comprising:
   a housing having a longitudinal axis therethrough and a first end and a second end opposite the first end;
   a dial encircling the housing and coupled thereto such that the dial is rotatable about the housing, the dial having a helical first portion along an interior wall of the dial; and
   a flow control ring having a helical second portion along an exterior wall of the flow control ring that threadingly engages with the helical first portion, the helical second portion rotatably mating with the helical first portion, wherein rotation of the dial in a first direction moves the flow control ring in a first longitudinal direction along the longitudinal axis to cause a first adjustment in airflow past the flow control ring and rotation of the dial in an opposite direction moves the flow control ring in an opposite longitudinal direction along the longitudinal axis to cause a second adjustment in airflow past the flow control ring.

2. The PSU of claim 1 further comprising a passenger accessible control unit coupled to the housing, wherein the control unit allows for selection of at least one of lighting control and an attendant call notification.

3. The PSU of claim 2, the flow control ring having a first end facing the first longitudinal direction, wherein the first adjustment of airflow decreases airflow past the first end of the flow control ring and the second adjustment of airflow increases airflow past the first end of the flow control ring.

4. The PSU of claim 3, wherein the helical first portion includes a helical ridge and the helical second portion includes a helical groove.

5. The PSU of claim 3 further comprising a cavity between the housing and the dial, wherein the airflow past the flow control flows through the cavity and out the PSU.

6. The PSU of claim 2, the flow control ring having a first end facing the first longitudinal direction and a second end facing the second longitudinal direction, wherein the first adjustment of airflow decreases airflow past the second end of the flow control ring and the second adjustment of airflow increases airflow past the first end of the flow control ring.

7. The PSU of claim 6, the dial having a first end facing the first longitudinal direction and a second end facing the second longitudinal direction, wherein the airflow past the flow control ring flows under the second end of the dial and out the PSU.

8. The PSU of claim 7 further comprising a bezel having an air diverting channel therearound, wherein the air diverting channel diverts airflow to pass along an exterior wall of the dial to a passenger.

9. The PSU of claim 8 further comprising a plurality of spacers between the bezel and the housing, wherein passages between the spacers provide air passages for the airflow.

10. A personal service unit (PSU) comprising:
    a housing;
    a dial encircling the housing and coupled thereto such that the dial is rotatable about the housing, the dial having a helical first portion along an interior wall of the dial; and
    a flow control ring having a helical second portion along an exterior wall of the flow control ring, wherein the helical second portion rotatably couples with the helical first portion, and wherein rotation of the dial in a first direction moves the flow control ring in a first longitudinal direction to the dial to adjust an airflow exiting the PSU while rotation in an opposite direction moves the flow control ring in an opposite longitudinal direction to the dial to make an opposite adjustment to the airflow exiting the PSU, wherein the first longitudinal direction is substantially the same direction as the airflow exiting the PSU.

11. The PSU of claim 10 further comprising a passenger accessible control unit that is mountable to the housing and allows for selection of at least one of lighting control and an attendant call notification, wherein the helical first portion includes a helical ridge and a helical second portion includes a helical groove.

12. The PSU of claim 11 wherein the airflow exiting the PSU exits the PSU between the housing and the dial, and wherein the rotation of the dial in the first direction decreases the airflow exiting the PSU.

13. The PSU of claim 12 wherein when the flow control ring is moved in the first longitudinal direction the airflow passing over the flow control ring decreases, and wherein when the flow control ring is moved in the opposite longitudinal direction the airflow passing over the flow control ring increases.

14. The PSU of claim 11 wherein as the rotation of the dial in the first direction moves the flow control ring in the first longitudinal direction airflow passing under the flow control ring increases, and wherein as the rotation of the dial in the second direction moves the flow control ring in the second longitudinal direction airflow passing under the flow control ring decreases.

15. The PSU of claim 14 further comprising a bezel, the bezel having:
 a cylindrical wall; and
 a flange radially projecting from one end of the cylindrical wall, an air diversion channel encircling the flange, wherein the air diversion channel directs the airflow exiting the PSU past an outside wall of the dial to a passenger.

16. The PSU of claim 15 further comprising a plurality of spacers between the bezel and the housing, wherein passages between the spacers provide air passages for the airflow.

17. A method of assembling a personal service unit (PSU) comprising:
 encircling a dial around a housing such that the dial is rotatable about the housing, wherein the dial has a passenger facing end and an opposite end; and
 mating threads of a flow control ring to threads of the dial such that rotation of the dial in a first direction moves the flow control ring towards the passenger facing end of the dial and rotation of the dial in an opposite direction moves the flow control ring towards the opposite end of the dial, wherein (i) the rotation in the first direction one of increases airflow past the flow control ring and out of the PSU and decreases airflow past the flow control ring and out of the PSU and (ii) the rotation in the opposite direction has an opposite effect on airflow than rotation in the first direction, and wherein an assembled PSU is mountable to a cabin interior.

18. The method of claim 17 further comprising coupling a passenger control unit to the housing such that the dial encircles the passenger control unit, wherein the passenger control unit allows a passenger to control at least one lighting and attendant call notifications.

19. The method of claim 18 wherein the rotation of the dial in the first direction moves the flow control ring towards the passenger facing end of the dial to decrease airflow, and wherein the airflow past the flow control ring passes between the dial and the housing as it exits the PSU.

20. The method of claim 18 further comprising coupling a bezel to a bottom portion of the housing, the bezel having a bezel channel around the bezel configured to direct the airflow past the flow control ring along an outside wall of the dial and to a passenger, wherein the rotation of the dial in the first direction moves the flow control ring towards the opposite end of the dial.

* * * * *